United States Patent
Huang et al.

(10) Patent No.: US 11,871,408 B2
(45) Date of Patent: Jan. 9, 2024

(54) PHYSICAL UPLINK CONTROL CHANNEL REPETITION ACROSS SLOT TYPES

(71) Applicant: QUALCOMM Incorporated, San Diego, CA (US)

(72) Inventors: Yi Huang, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 17/303,394

(22) Filed: May 27, 2021

(65) Prior Publication Data
US 2021/0392666 A1    Dec. 16, 2021

Related U.S. Application Data

(60) Provisional application No. 63/039,693, filed on Jun. 16, 2020.

(51) Int. Cl.
*H04W 72/1268*    (2023.01)
*H04W 72/0446*    (2023.01)
*H04W 72/23*    (2023.01)

(52) U.S. Cl.
CPC ... *H04W 72/1268* (2013.01); *H04W 72/0446* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2017/0064686 A1* | 3/2017 | Li | H04W 72/20 |
| 2018/0192416 A1* | 7/2018 | Yin | H04L 5/0053 |
| 2018/0227949 A1* | 8/2018 | Tiirola | H04W 74/04 |
| 2019/0089502 A1* | 3/2019 | Yi | H04W 16/14 |
| 2020/0059328 A1* | 2/2020 | Li | H04W 52/0212 |
| 2020/0092068 A1 | 3/2020 | Yang et al. | |
| 2020/0145169 A1* | 5/2020 | Zhou | H04B 1/713 |
| 2020/0205150 A1* | 6/2020 | Cheng | H04W 72/0413 |
| 2020/0214006 A1* | 7/2020 | Choi | H04L 5/0007 |
| 2021/0037519 A1* | 2/2021 | Matsumura | H04J 13/0074 |

(Continued)

OTHER PUBLICATIONS

International Search Report and Written Opinion—PCT/US2021/070631—ISA/EPO—dated Sep. 20, 2021.

(Continued)

*Primary Examiner* — Ajit Patel
*Assistant Examiner* — Liem H. Nguyen
(74) *Attorney, Agent, or Firm* — QUALCOMM Incorporated

(57) ABSTRACT

Various aspects of the present disclosure generally relate to wireless communication. In some aspects, a user equipment (UE) may receive, from a base station, a first physical uplink control channel (PUCCH) resource indicator, which indicates a first PUCCH resource for a first instance of a repeated PUCCH message, and a second PUCCH resource indicator, which indicates a second PUCCH resource for a second instance of the repeated PUCCH message. The UE may determine a first slot for the first instance and a second slot for the second instance, and transmit the first instance in the first PUCCH resource in the first slot and the second instance in the second PUCCH resource in the second slot. Numerous other aspects are described.

30 Claims, 17 Drawing Sheets

(56) References Cited

U.S. PATENT DOCUMENTS

| | | | | |
|---|---|---|---|---|
| 2021/0136749 | A1* | 5/2021 | Matsumura | H04L 5/0053 |
| 2021/0345375 | A1* | 11/2021 | Abotabl | H04W 72/0446 |
| 2021/0377926 | A1* | 12/2021 | Li | H04L 5/0053 |
| 2022/0030443 | A1* | 1/2022 | Chen | H04W 72/21 |
| 2022/0046675 | A1* | 2/2022 | Jung | H04L 1/1812 |
| 2022/0086032 | A1* | 3/2022 | Park | H04L 1/1664 |
| 2022/0095318 | A1* | 3/2022 | Yi | H04W 72/121 |
| 2022/0103294 | A1* | 3/2022 | Ying | H04W 72/23 |
| 2022/0116968 | A1* | 4/2022 | Choi | H04L 5/0053 |
| 2022/0131654 | A1* | 4/2022 | Oh | H04L 5/0023 |
| 2022/0303054 | A1* | 9/2022 | Zhang | H04L 1/189 |
| 2023/0053388 | A1* | 2/2023 | Yamamoto | H04L 5/0053 |
| 2023/0060179 | A1* | 3/2023 | Yin | H04L 5/0012 |
| 2023/0077264 | A1* | 3/2023 | Gao | H04L 5/0023 |
| 2023/0102171 | A1* | 3/2023 | Su | H04L 5/0091 |
| | | | | 370/329 |
| 2023/0114039 | A1* | 4/2023 | Manolakos | H04L 5/0094 |
| | | | | 370/329 |

OTHER PUBLICATIONS

Samsung: "Considerations on Potential Techniques for Coverage Enhancement", 3GPP Draft, R1-2003916, 3GPP TSG RAN WG1 #101-e, 3rd Generation Partnership Project (3GPP), Mobile Competence Centre, 650, Route Des Lucioles, F-06921 Sophia-Antipolis Cedex, France, vol. RAN WG1. No. e-Meeting, May 25, 2020-Jun. 5, 2020, May 15, 2020 (May 15, 2020), XP051885682, pp. 1-6, Retrieved from the Internet: URL:https://ftp.3gpp.org/tsg_ran/WG1_RL1/TSGR1_101-e/Docs/R1-2003916.zip R1-2003916 Considerations on Potential Techniques for Coverage Enhancement.docx [retrieved on May 15, 2020] p. 6, paragraph 3 figure 4.

* cited by examiner

PHYSICAL UPLINK CONTROL CHANNEL REPETITION ACROSS SLOT TYPES

CROSS-REFERENCE TO RELATED APPLICATION

This Patent Application claims priority to U.S. Provisional Patent Application No. 63/039,693, filed on Jun. 16, 2020, entitled "PHYSICAL UPLINK CONTROL CHANNEL REPETITION ACROSS SLOT TYPES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for physical uplink control channel repetition across slot types.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include receiving, from a base station, a first physical uplink control channel (PUCCH) resource indicator, which indicates a first PUCCH resource for a first instance of a repeated PUCCH message, and a second PUCCH resource indicator, which indicates a second PUCCH resource for a second instance of the repeated PUCCH message. The method may include determining a first slot for the first instance and a second slot for the second instance, and transmitting the first instance in the first PUCCH resource in the first slot and the second instance in the second PUCCH resource in the second slot.

In some aspects, a method of wireless communication, performed by a base station, may include determining, for a repeated PUCCH message from a UE, a first PUCCH resource for a first instance of the repeated PUCCH message and a second PUCCH resource for a second instance of the repeated PUCCH message, and transmitting, to the UE, a first PUCCH resource indicator that indicates the first PUCCH resource for the first instance and a second PUCCH resource indicator that indicates the second PUCCH resource for the second instance.

In some aspects, a UE for wireless communication may include a memory and one or more processors coupled to the memory. The one or more processors may be configured to receive, from a base station, a first PUCCH resource indicator, which indicates a first PUCCH resource for a first instance of a repeated PUCCH message, and a second PUCCH resource indicator, which indicates a second PUCCH resource for a second instance of the repeated PUCCH message. The one or more processors may be configured to determine a first slot for the first instance and a second slot for the second instance, and transmit the first instance in the first PUCCH resource in the first slot and the second instance in the second PUCCH resource in the second slot.

In some aspects, a base station for wireless communication may include a memory and one or more processors coupled to the memory. The one or more processors may be configured to determine, for a repeated PUCCH message from a UE, a first PUCCH resource for a first instance of the repeated PUCCH message and a second PUCCH resource for a second instance of the repeated PUCCH message, and transmit, to the UE, a first PUCCH resource indicator that indicates the first PUCCH resource for the first instance and a second PUCCH resource indicator that indicates the second PUCCH resource for the second instance.

In some aspects, a non-transitory computer-readable medium may store one or more instructions for wireless communication. The one or more instructions, when executed by one or more processors of a UE, may cause the one or more processors to receive, from a base station, a first PUCCH resource indicator, which indicates a first PUCCH resource for a first instance of a repeated PUCCH message, and a second PUCCH resource indicator, which indicates a second PUCCH resource for a second instance of the repeated PUCCH message. The one or more instructions, when executed by one or more processors of a UE, may cause the one or more processors to determine a first slot for the first instance and a second slot for the second instance, and transmit the first instance in the first PUCCH resource in the first slot and the second instance in the second PUCCH resource in the second slot.

In some aspects, a non-transitory computer-readable medium may store one or more instructions for wireless communication. The one or more instructions, when executed by one or more processors of a base station, may cause the one or more processors to determine, for a repeated PUCCH message from a UE, a first PUCCH resource for a first instance of the repeated PUCCH message and a second PUCCH resource for a second instance of the repeated PUCCH message, and transmit, to the UE, a first PUCCH resource indicator that indicates the first PUCCH resource for the first instance and a second PUCCH resource indicator that indicates the second PUCCH resource for the second instance.

In some aspects, an apparatus for wireless communication may include means for receiving, from a base station, a first PUCCH resource indicator, which indicates a first PUCCH resource for a first instance of a repeated PUCCH message, and a second PUCCH resource indicator, which indicates a second PUCCH resource for a second instance of the repeated PUCCH message. The apparatus may include means for determining a first slot for the first instance and a second slot for the second instance, and means for transmitting the first instance in the first PUCCH resource in the first slot and the second instance in the second PUCCH resource in the second slot.

In some aspects, an apparatus for wireless communication may include means for determining, for a repeated PUCCH message from a UE, a first PUCCH resource for a first instance of the repeated PUCCH message and a second PUCCH resource for a second instance of the repeated PUCCH message, and means for transmitting, to the UE, a first PUCCH resource indicator that indicates the first PUCCH resource for the first instance and a second PUCCH resource indicator that indicates the second PUCCH resource for the second instance.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
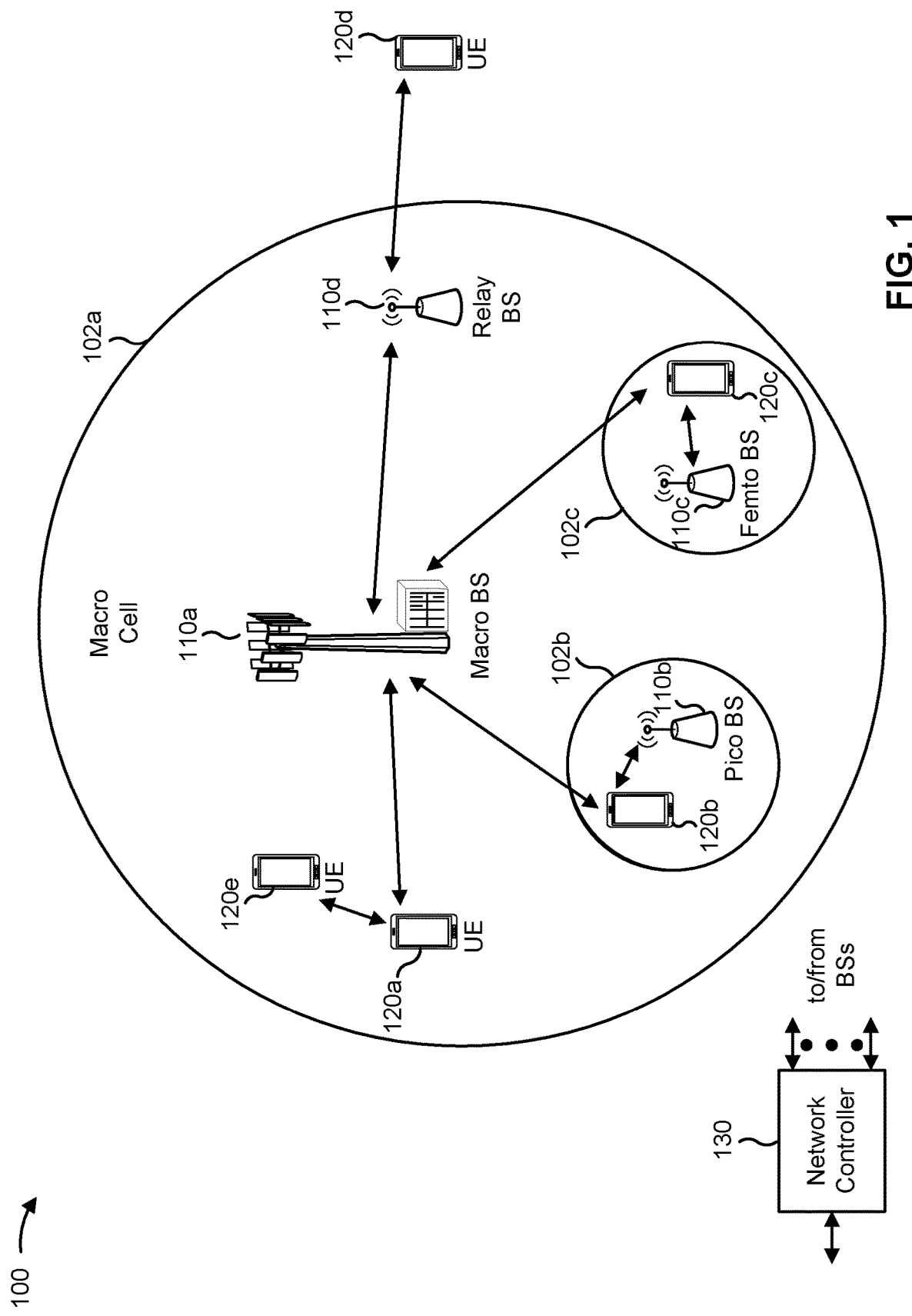
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
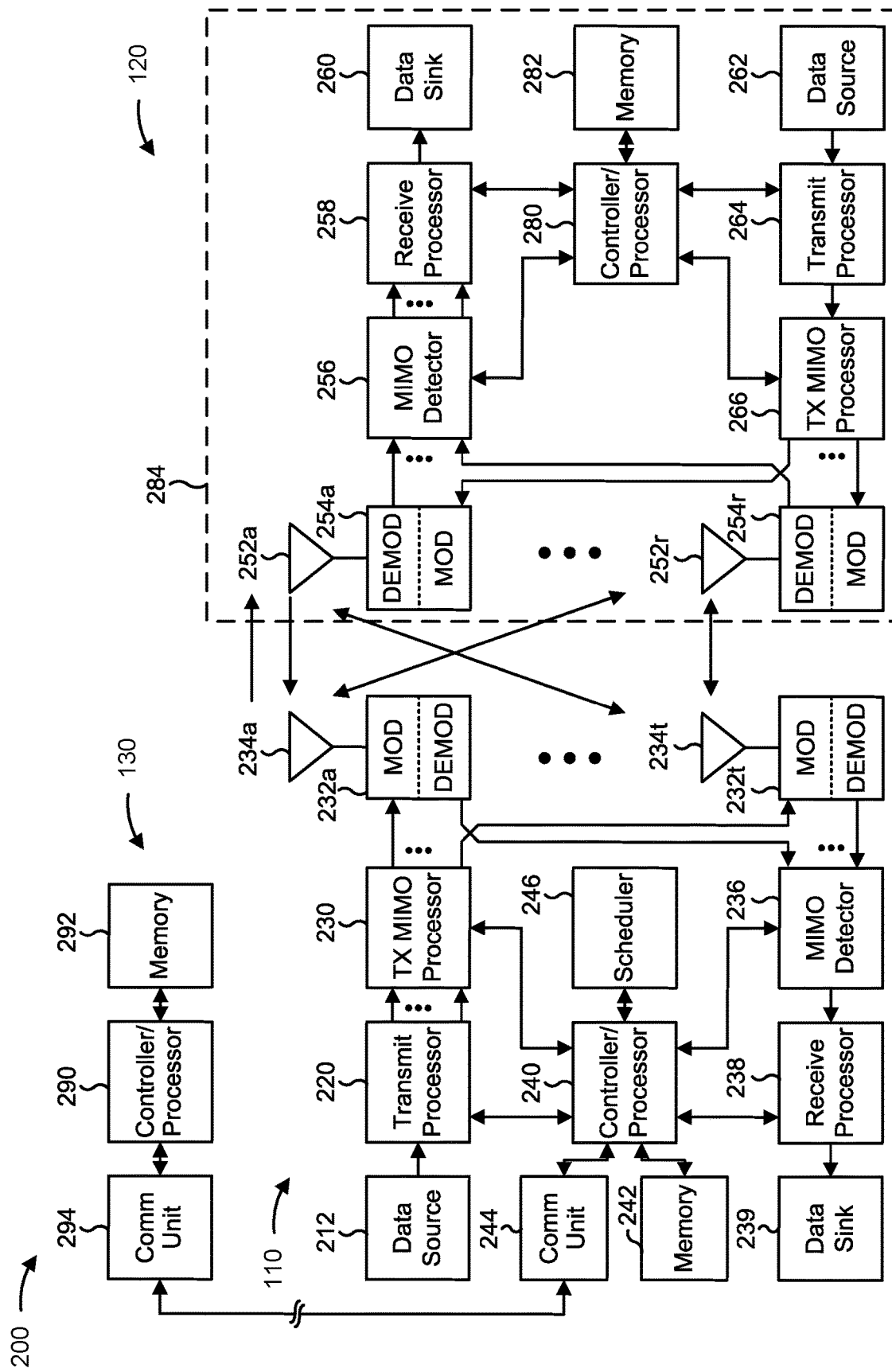
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 13-17).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 13-17).

Controller/processor 240 of base station 110, controller/processor 280 of UE 120, and/or any other component(s) of FIG. 2 may perform one or more techniques associated with physical uplink control channel (PUCCH) repetition across slot types, as described in more detail elsewhere herein. For example, controller/processor 240 of base station 110, controller/processor 280 of UE 120, and/or any other component(s) of FIG. 2 may perform or direct operations of, for example, process 1600 of FIG. 16, process 1700 of FIG. 17, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 1600 of FIG. 16, process 1700 of FIG. 17, and/or other processes as described herein. In some aspects, executing instructions may include running the instructions, converting the instructions, compiling the instructions, and/or interpreting the instructions, among other examples.

In some aspects, UE 120 may include means for receiving, from a base station, a first PUCCH resource indicator, which indicates a first PUCCH resource for a first instance of a repeated PUCCH message, and a second PUCCH resource indicator, which indicates a second PUCCH resource for a second instance of the repeated PUCCH message, means for determining a first slot for the first instance and a second slot for the second instance, and/or means for transmitting the first instance in the first PUCCH resource in the first slot and the second instance in the second PUCCH resource in the second slot. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for determining, for a repeated PUCCH message from a UE, a first PUCCH resource for a first instance of the repeated PUCCH message and a second PUCCH resource for a second instance of the repeated PUCCH message, and/or means for transmitting, to the UE, a first PUCCH resource indicator that indicates the first PUCCH resource for the first instance and a second PUCCH resource indicator that indicates the second PUCCH resource for the second instance. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
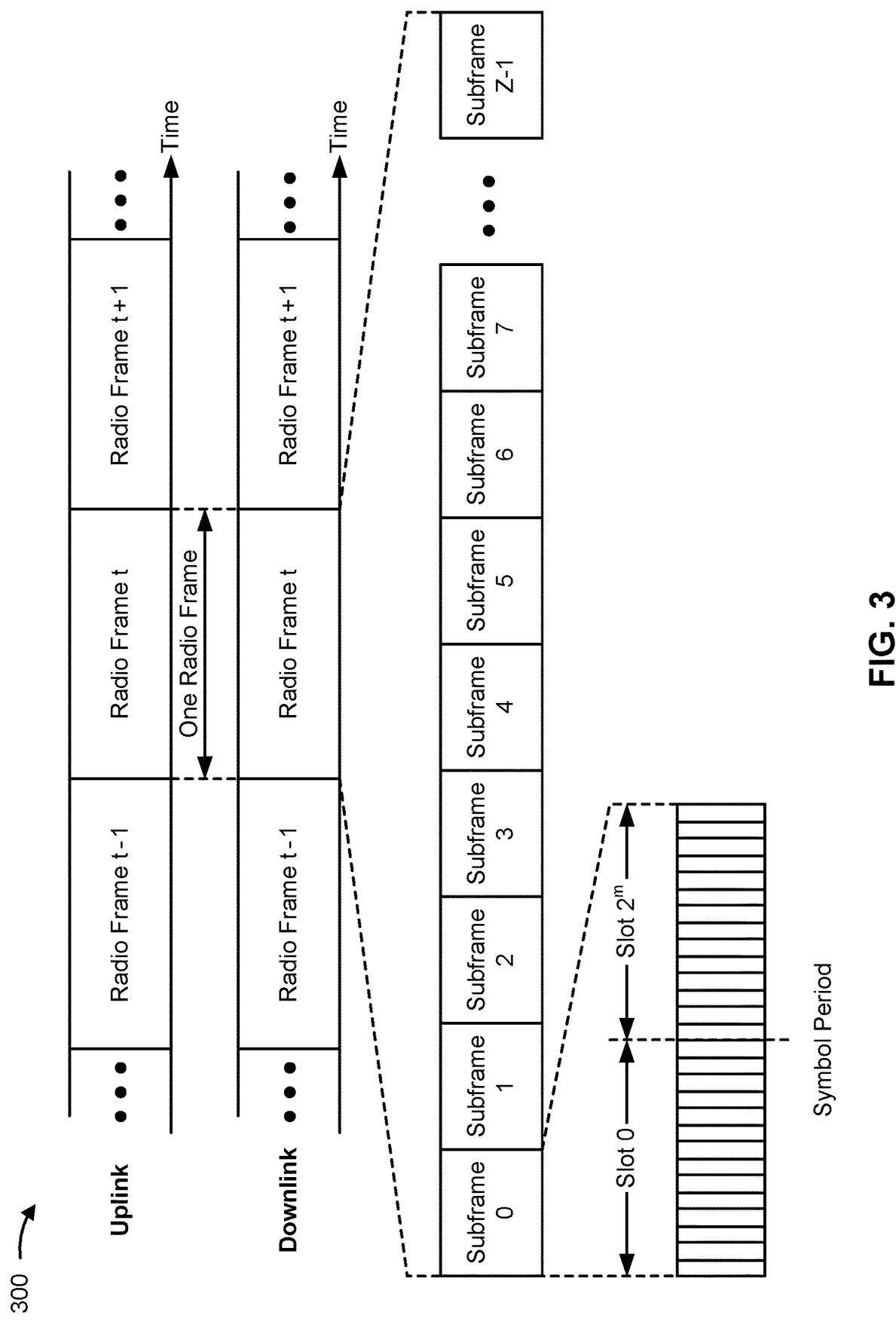
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, symbol-based, and/or the like.

As indicated above, FIG. 3 is provided as an example. Other examples may differ from what is described with respect to FIG. 3.

Figure 4:
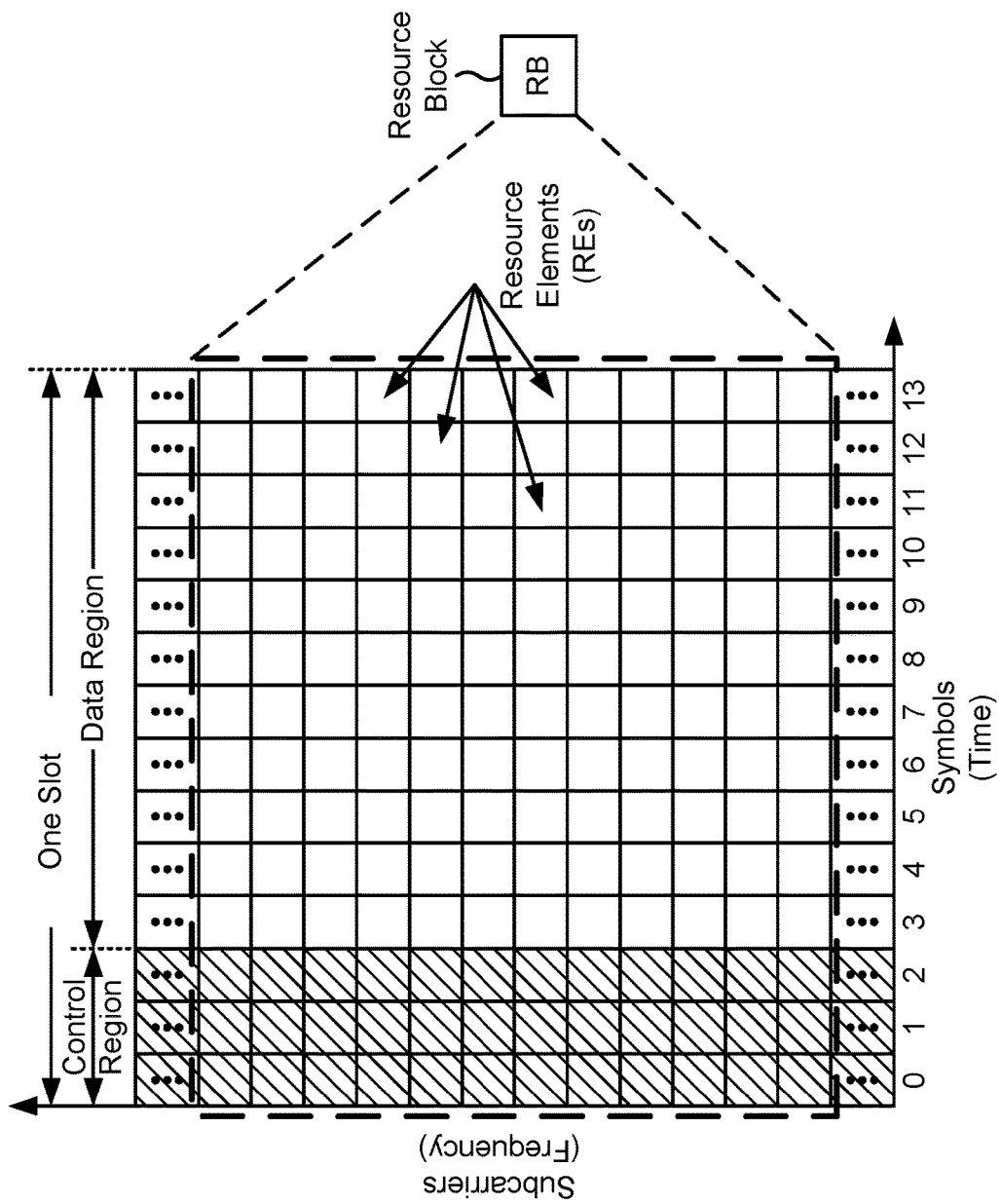
FIG. 4 is a diagram illustrating an example of a slot format, in accordance with the present disclosure.

FIG. 4 is a diagram illustrating an example 400 of a slot format, in accordance with the present disclosure. As shown in FIG. 4, time-frequency resources in a radio access network may be partitioned into resource blocks, shown by a single resource block (RB) 405. An RB 405 is sometimes referred to as a physical resource block (PRB). An RB 405 includes a set of subcarriers (e.g., 12 subcarriers) and a set of symbols (e.g., 14 symbols) that are schedulable by a base station 110 as a unit. In some aspects, an RB 405 may include a set of subcarriers in a single slot. As shown, a single time-frequency resource included in an RB 405 may be referred to as a resource element (RE) 410. An RE 410 may include a single subcarrier (e.g., in frequency) and a single symbol (e.g., in time). A symbol may be referred to as an orthogonal frequency division multiplexing (OFDM) symbol. An RE 410 may be used to transmit one modulated symbol, which may be a real value or a complex value.

In some telecommunication systems (e.g., NR), RBs 405 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format, and/or the like). A slot may be configured with a link direction for transmission, such as downlink (D) or uplink (U). In some aspects, the link direction for a slot may be dynamically configured. A slot may also be configured as a special slot (S) that may include a guard time for switching directions.

As indicated above, FIG. 4 is provided as an example. Other examples may differ from what is described with respect to FIG. 4.

Figure 5:
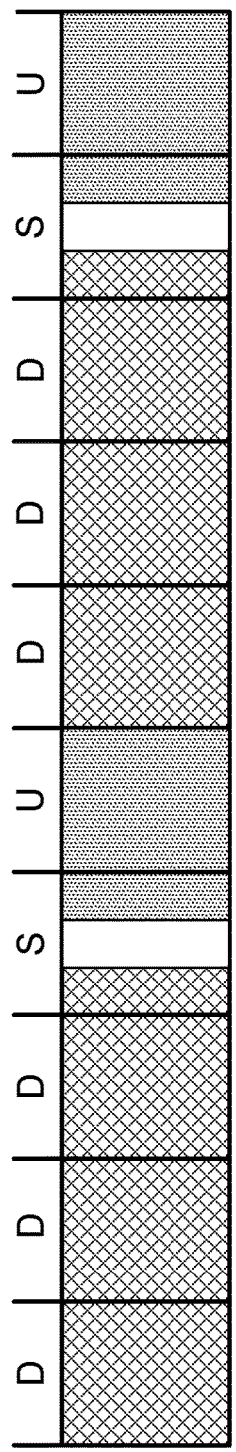
FIG. 5 is a diagram illustrating an example of slot types, in accordance with the present disclosure.

FIG. 5 is a diagram illustrating an example 500 of slot types, in accordance with the present disclosure.

In some aspects, a frame may have $10 \times 2^\mu$ slots, where $\mu$ is related to a subcarrier space that is used by a network. The network may configure a slot pattern with a designated slot type for each slot.

FIG. 5 shows 10 slots, where the first few slots are for downlink transmission (D), and a next slot is a special (S) slot. In FIG. 5, both special slots include REs for downlink transmission (all subcarriers but a limited quantity of symbols), a guard time, and REs for uplink transmission (all subcarriers but also a limited quantity of symbols). In the slot pattern shown by FIG. 5, a slot for uplink transmission is adjacent to and immediately follows each special slot. Accordingly, the slot pattern in FIG. 5 may be noted as "DDDSUDDDSU".

As indicated above, FIG. 5 is provided as an example. Other examples may differ from what is described with respect to FIG. 5.

Figure 6:
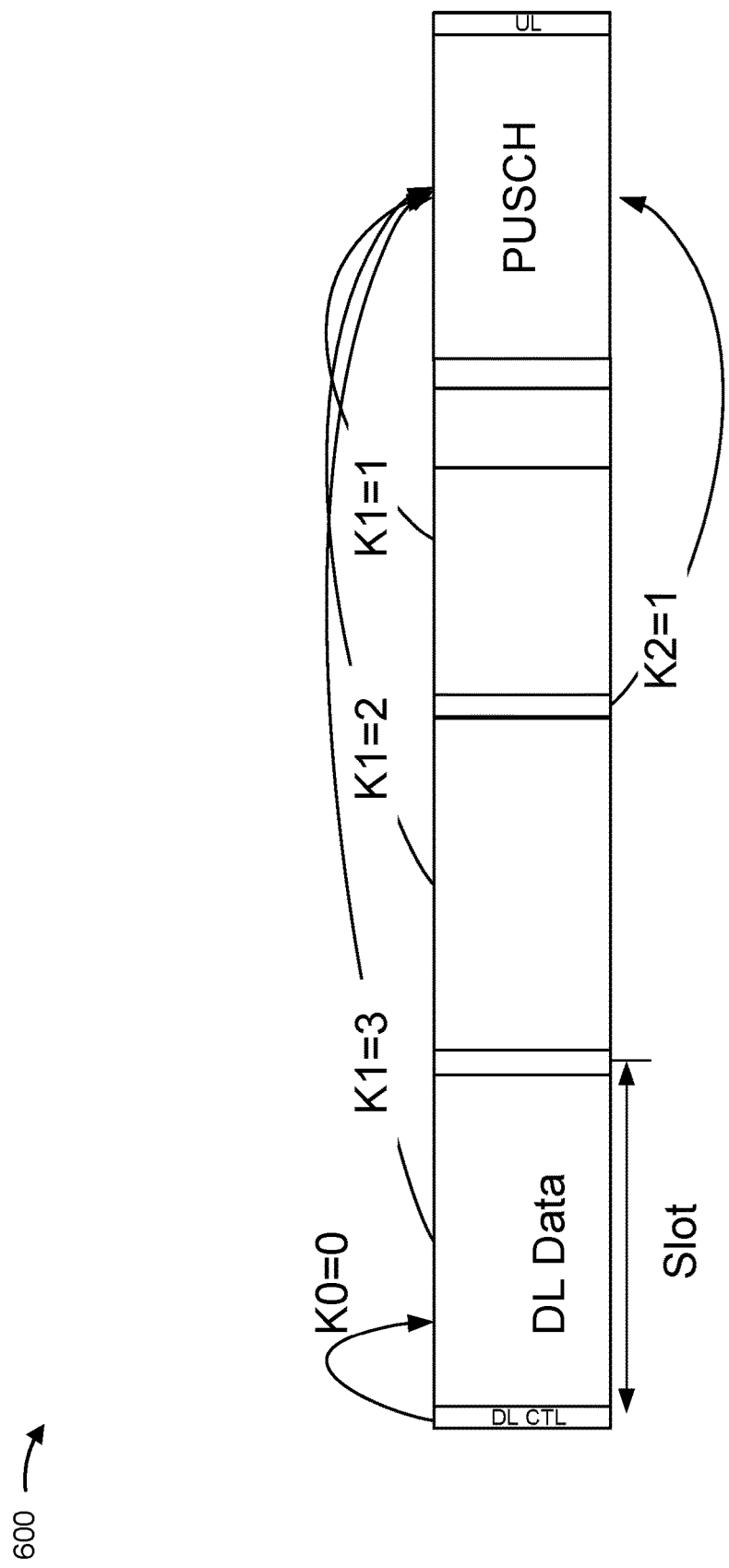
FIG. 6 is a diagram illustrating an example of time division duplexing, in accordance with the present disclosure.

FIG. 6 is a diagram illustrating an example 600 of time division duplexing (TDD), in accordance with the present disclosure.

FIG. 6 shows an example of a slot pattern of "DDSU" used by a network. The network may indicate the slot pattern with a slot format indicator, and operators may use the same slot pattern in adjacent channels. For unpaired spectrum, where a single frequency band is used for both uplink and downlink, the network may use TDD to schedule transmissions in the uplink and the downlink. In some aspects, the transmissions may be dynamically scheduled. FIG. 6 shows downlink control information that precedes a downlink data transmission. An uplink data transmission follows the downlink data transmissions.

As indicated above, FIG. 6 is provided as an example. Other examples may differ from what is described with respect to FIG. 6.

Figure 7:
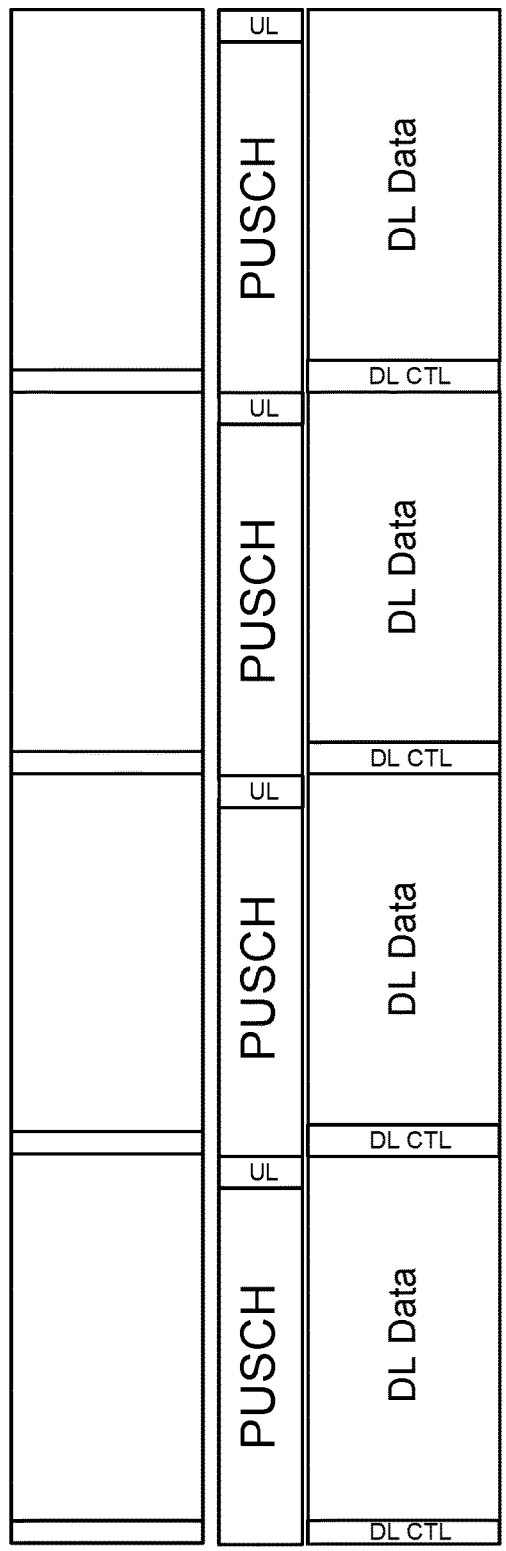
FIG. 7 is a diagram illustrating an example of frequency division duplexing (FDD), in accordance with the present disclosure.

FIG. 7 is a diagram illustrating an example 700 of FDD, in accordance with the present disclosure.

FIG. 7 shows a component carrier that is partitioned into downlink bandwidth and uplink bandwidth. This partitioning helps to limit losses for a UE at a cell edge. FDD may be applied across component carriers, or within component carriers for carrier aggregation. Downlink data may be transmitted one frequency portion of the component carrier, such as a bandwidth part (BWP) for higher or lower frequencies, while uplink data may be transmitted in a middle BWP. For example, FIG. 7 shows downlink data transmitted in a lower BWP and physical uplink shared channel (PUSCH) transmitted in a middle BWP. There may be some spacing for a guard bandwidth. This slot pattern may be full duplex capable.

FDD reduces latency for always-on uplink, boosts power for higher uplink throughput, and may be combined with TDD. A slot that provides bidirectional transmission on different subbands within a same component carrier may have a slot type that is referred to as subband full duplex (SBFD).

As indicated above, FIG. 7 is provided as an example. Other examples may differ from what is described with respect to FIG. 7.

Figure 8:
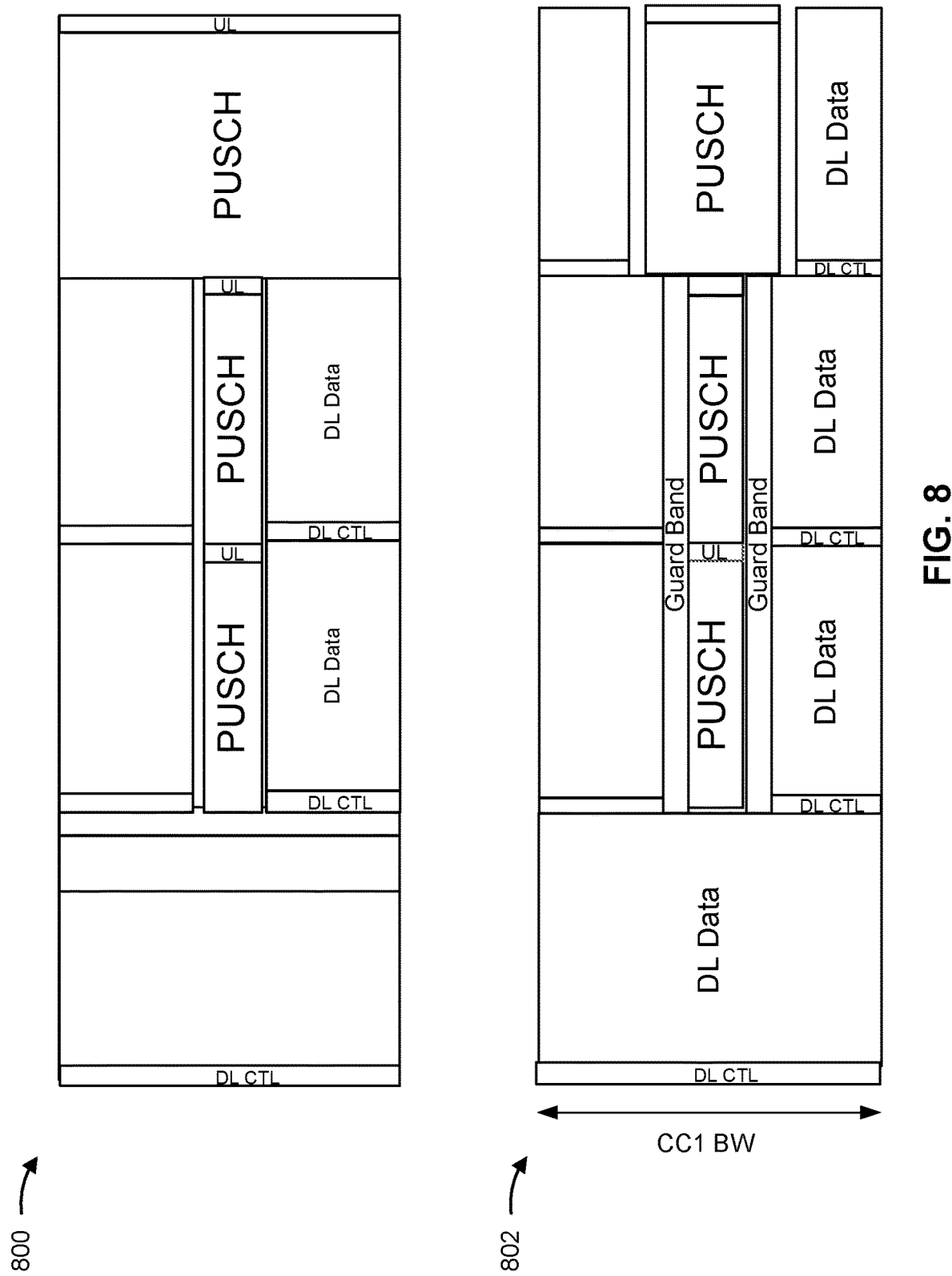
FIG. 8 is a diagram illustrating examples of FDD, in accordance with the present disclosure.

FIG. 8 is a diagram illustrating examples 800, 802 of FDD, in accordance with the present disclosure.

A network may use different variations of slot patterns. For example, FIG. 8 shows an example 800 of a slot pattern of a special slot, two SBFD slots, and an uplink slot. FIG. 8 shows an example 802 of a slot pattern of a downlink slot, two SBFD slots with a first BWP size for uplink, and an SBFD slot with a second, larger BWP size for uplink. In some aspects, in one SBFD slot, a BWP for uplink may be 80 megahertz (MHz) and a BWP for downlink may be 20 MHz, while in another SBFD slot, a BWP for uplink may be 20 MHz and a BWP for downlink may be 80 MHz.

As indicated above, FIG. 8 provides some examples. Other examples may differ from what is described with respect to FIG. 8.

Figure 9:
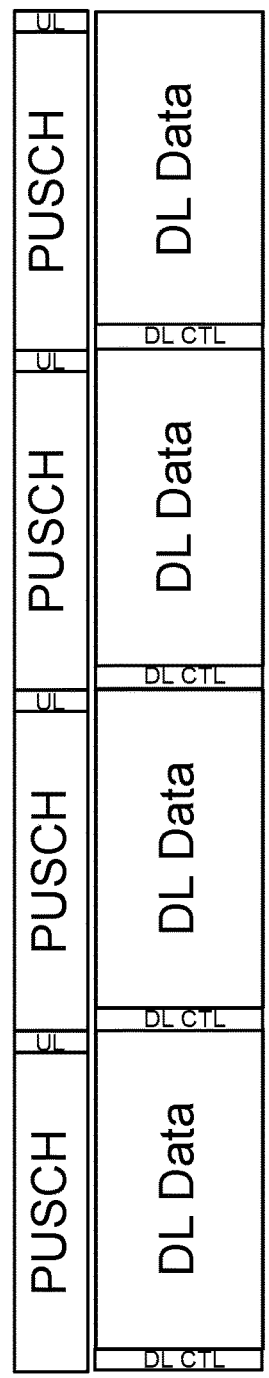
FIG. 9 is a diagram illustrating example of FDD, in accordance with the present disclosure.

FIG. 9 is a diagram illustrating an example 900 of FDD, in accordance with the present disclosure.

FIG. 9 shows an example 900 of a slot pattern with contiguous uplink and downlink BWPs. For example, the slot pattern shown in FIG. 9, with a PUSCH in a same BWP of each slot, and downlink data in a same BWP of each slot. This pattern may be considered fixed contiguous uplink and downlink FDD.

As indicated above, FIG. 9 provides an example. Other examples may differ from what is described with respect to FIG. 9.

Figure 10:
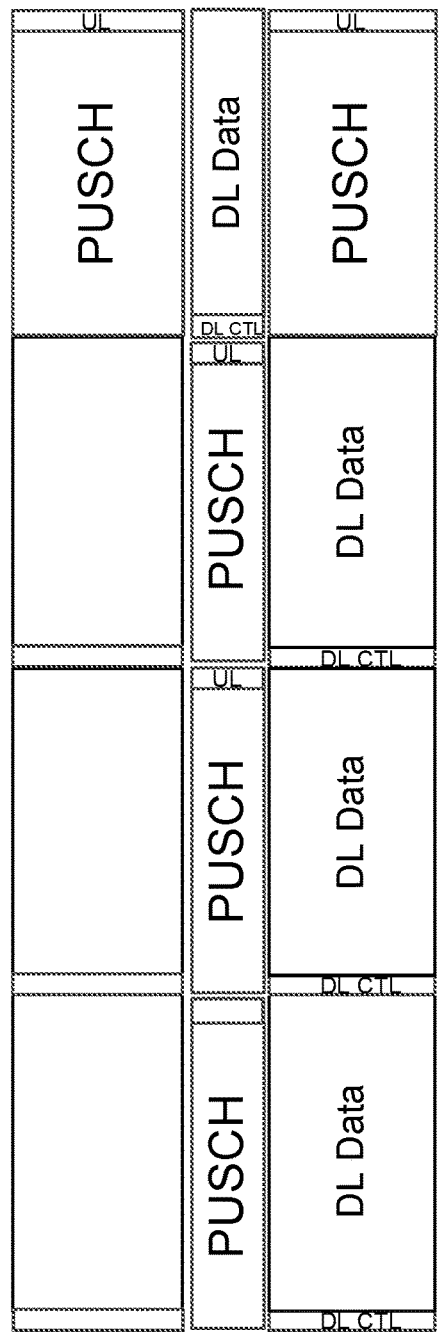
FIG. 10 is a diagram illustrating an example of FDD, in accordance with the present disclosure.

FIG. 10 is a diagram illustrating an example 1000 of FDD, in accordance with the present disclosure.

FIG. 10 shows an example 1000 of a slot pattern with a variable allocation of SBFD slots. The first three SBFD slots allocate more bandwidth to downlink data, in a contiguous uplink and downlink pattern. FIG. 10 also shows a fourth SBFD slot that allocates more bandwidth to uplink data on a PUSCH. For example, the PUSCH is transmitted on larger BWPs surrounding a smaller BWP for downlink data.

As indicated above, FIG. 10 is provided as an example. Other examples may differ from what is described with respect to FIG. 10.

Figure 11:
FIG. 11 is a diagram illustrating an example of a physical uplink control channel (PUCCH) resource set, in accordance with the present disclosure.

FIG. 11 is a diagram illustrating an example 1100 of a PUCCH resource set, in accordance with the present disclosure.

A UE may be configured with up to four PUCCH resource sets. A PUCCH resource set may be configured with up to 16 PUCCH resources. A PUCCH resource is a set of time-frequency REs that include a quantity of frequency tones (subcarriers) and a quantity of OFDM symbols. The UE may use one of the four PUCCH resource sets based at least in part on an uplink control information (UCI) payload size. A base station (e.g., gNB) may indicate to a UE which PUCCH resource set to use with three explicit bits in downlink control information (DCI) for a physical downlink shared channel RE mapping indicator and one bit based control channel element index.

FIG. 11 shows an example 1100 of a PUCCH resource set with 8 PUCCH resources. Each PUCCH resource is shown as a configuration of REs within a tone*OFDM symbol grid. In FIG. 11, tones (subcarriers) are shown in a vertical direction, and OFDM symbols are shown in a horizontal direction. There are varying "shapes" and "sizes" for an RE configuration. For example, one RE configuration may have a wide rectangular shape and a small quantity of REs, while another RE configuration may have fewer symbols but a large number of subcarriers (tall and thin). In some aspects, different RE configurations may have the same quantity of REs. In some aspects, different RE configurations may have a different quantity of REs.

As indicated above, FIG. 11 is provided as an example. Other examples may differ from what is described with respect to FIG. 11.

Figure 12:
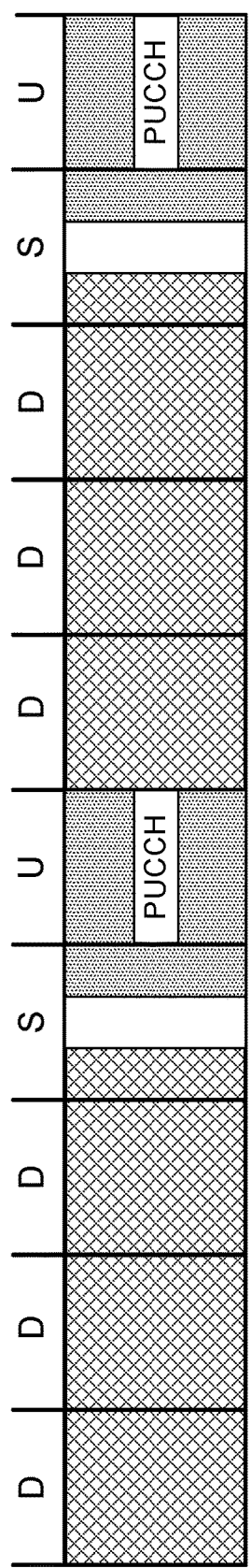
FIG. 12 is a diagram illustrating an example of a PUCCH repetition in a slot pattern, in accordance with the present disclosure.

FIG. 12 is a diagram illustrating an example 1200 of a PUCCH repetition in a slot pattern, in accordance with the present disclosure. FIG. 12 shows a first instance of a repeated PUCCH message (also referred to herein as a PUCCH repetition) by a UE in a first uplink slot and a second instance of the PUCCH repetition in a second uplink slot. Even though a PUCCH resource has an RE configuration with only a few subcarriers, the RE configuration has a large quantity of symbols (e.g., 14 symbols). If a PUCCH resource is limited to one RE configuration, some PUCCH resources may not fit in an S slot type or an SBFD slot type. For example, the PUCCH resource shown in FIG. 12 fits in an uplink slot but the PUCCH resource cannot fit in the fewer uplink REs of a previous special slot. Because the slot pattern shown in FIG. 12 is "DDDSUDDDSU", there are four slots between the first uplink slot and the second uplink slot. Therefore, there will be some latency before the UE completes the PUCCH repetition, and the latency may affect the quality of service for a user of the UE. The latency also highlights inefficient use of signaling resources.

As indicated above, FIG. 12 is provided as an example. Other examples may differ from what is described with respect to FIG. 12.

Figure 13:
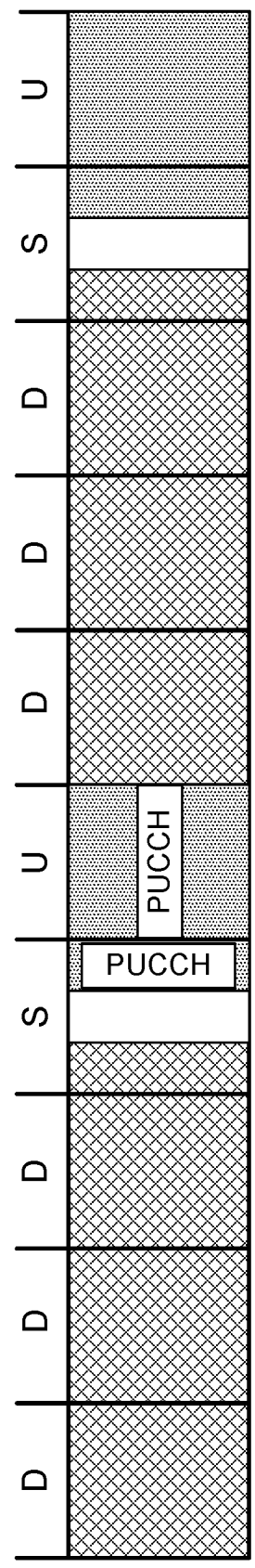
FIG. 13 is a diagram illustrating an example of a PUCCH repetition across slot types, in accordance with the present disclosure.

FIG. 13 is a diagram illustrating an example 1300 of a PUCCH repetition across slot types, in accordance with the present disclosure.

According to various aspects described herein, a base station may provide at least two PUCCH resource indicators (e.g., in DCI) instead of just one PUCCH resource indicator. Each PUCCH resource indicator may indicate a PUCCH resource with an RE configuration (e.g., M frequency tones*N OFDM symbols), and thus PUCCH resources of different RE configurations may be used for instances of a PUCCH repetition. A UE may be able to schedule instances of a PUCCH repetition in adjacent slots (or closer slots) and reduce or eliminate latency between instances. The UE may save signaling resources and improve a quality of service.

For example, FIG. 13 shows the same slot pattern as shown in FIG. 12. However, because the base station determines that a "taller" RE configuration fits uplink REs of a special slot, the base station may indicate, with a first PUCCH resource indicator, a first PUCCH resource for the first instance for a PUCCH repetition with such an RE configuration. The next slot is an uplink slot that can accommodate a PUCCH resource that had a large quantity of symbols with fewer subcarriers (a "long and wide" RE configuration). The base station may indicate, with a second PUCCH resource indicator, a second PUCCH resource for the second instance of the PUCCH repetition with such an RE configuration. The UE does not need to wait for the next uplink slot to complete the repetition, and latency is reduced.

As indicated above, FIG. 13 is provided as an example. Other examples may differ from what is described with respect to FIG. 13. For example, other sizes or shapes of RE configurations may fit within other appropriately sized PUCCH resources.

Figure 14:
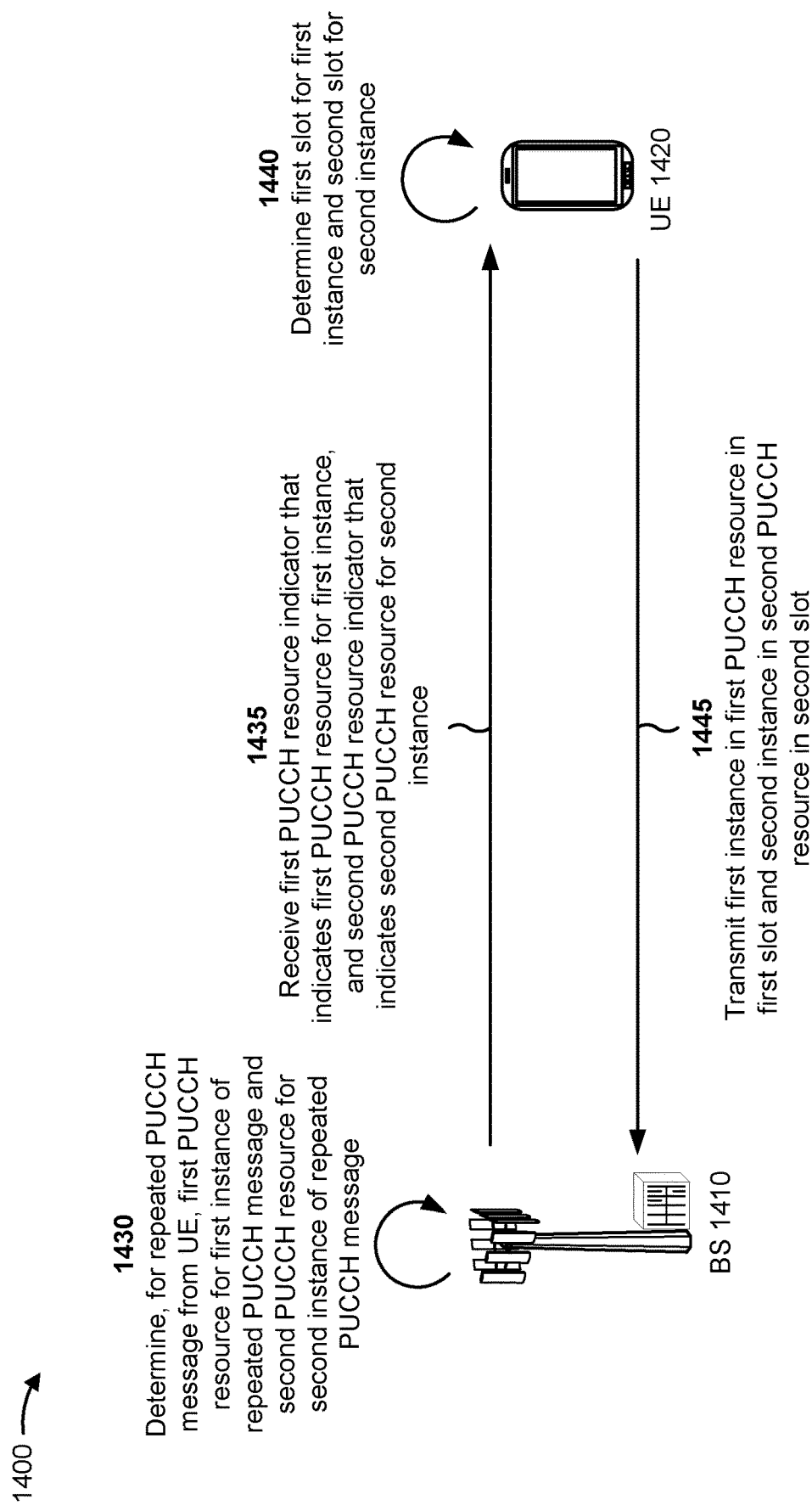
FIG. 14 is a diagram illustrating an example of PUCCH repetition across slot types, in accordance with the present disclosure.

FIG. 14 is a diagram illustrating an example 1400 of PUCCH repetition across slot types, in accordance with the present disclosure. FIG. 14 shows a base station 1410 (e.g., BS 110 depicted in FIGS. 1 and 2) and a UE 1420 (e.g., a UE 120 depicted in FIGS. 1 and 2) that may communicate with each other.

BS 1410 may determine a first slot for a first instance of a PUCCH repetition that will be transmitted by UE 1420. BS 1410 may indicate the first slot for the first instance in DCI.

As shown by reference number 1430, BS 1410 may determine, based at least in part on a first slot type of the first slot, a first PUCCH resource indicator that corresponds to an RE configuration that will fit in the first slot. BS 1410 may determine, based at least in part on a second slot type of a second slot, a second PUCCH resource indicator that corresponds to an RE configuration that will fit in the second slot. The first slot type and the second slot type may be different and thus the first slot type may have a PUCCH resource indicator and the second slot type may have a second PUCCH resource indicator that is different.

As shown by reference number 1435, BS 1410 may transmit, and UE 1420 may receive, the first PUCCH resource indicator for the first instance and the second PUCCH resource indicator for the second instance.

As shown by reference number 1440, UE 1420 may determine a first slot for the first instance. UE 1420 may transmit the first instance of a PUCCH repetition in a PUCCH resource of the first slot based at least in part on a first slot type of the first slot. The first PUCCH resource indicator may indicate a first PUCCH resource (which RE configuration to use as a PUCCH resource) for the first slot. UE 1420 may use the first PUCCH resource in the first slot for the first instance of the PUCCH repetition. UE 1420 may use a second PUCCH resource indicated by the second PUCCH resource indicator for transmitting a second instance of the PUCCH repetition in a second slot.

In some aspects, UE 1420 may prepare for each instance transmission by locating a next slot that has OFDM symbols configured or signaled by the BS 1410 for uplink transmission, and selecting a PUCCH resource to use (corresponding to a PUCCH resource indicator) based at least in part on a slot type of the next slot. In some aspects, there may be a mapping between PUCCH resource indicators and slot types. For example, the first PUCCH resource indicator may be for an uplink slot, the second PUCCH resource indicator may be for a special slot, and the third indicator may be for the SBFD slot. Based at least in part on a determined slot type for a given slot, the UE may use a corresponding PUCCH resource indicator for transmitting an instance in that slot.

As shown by reference number 1445, UE 1420 may transmit the first instance in the first PUCCH resource in the first slot and transmit the second instance in the second PUCCH resource in the second slot. As the slots may be closer together, or even adjacent, the UE experiences less latency.

While various aspects described herein involve two or three different PUCCH resource indicators, the described aspects may apply to more PUCCH resource indicators that correspond to other slot types, other SBFD slot configurations, or other RE configurations.

As indicated above, FIG. 14 is provided as an example. Other examples may differ from what is described with respect to FIG. 14.

Figure 15:
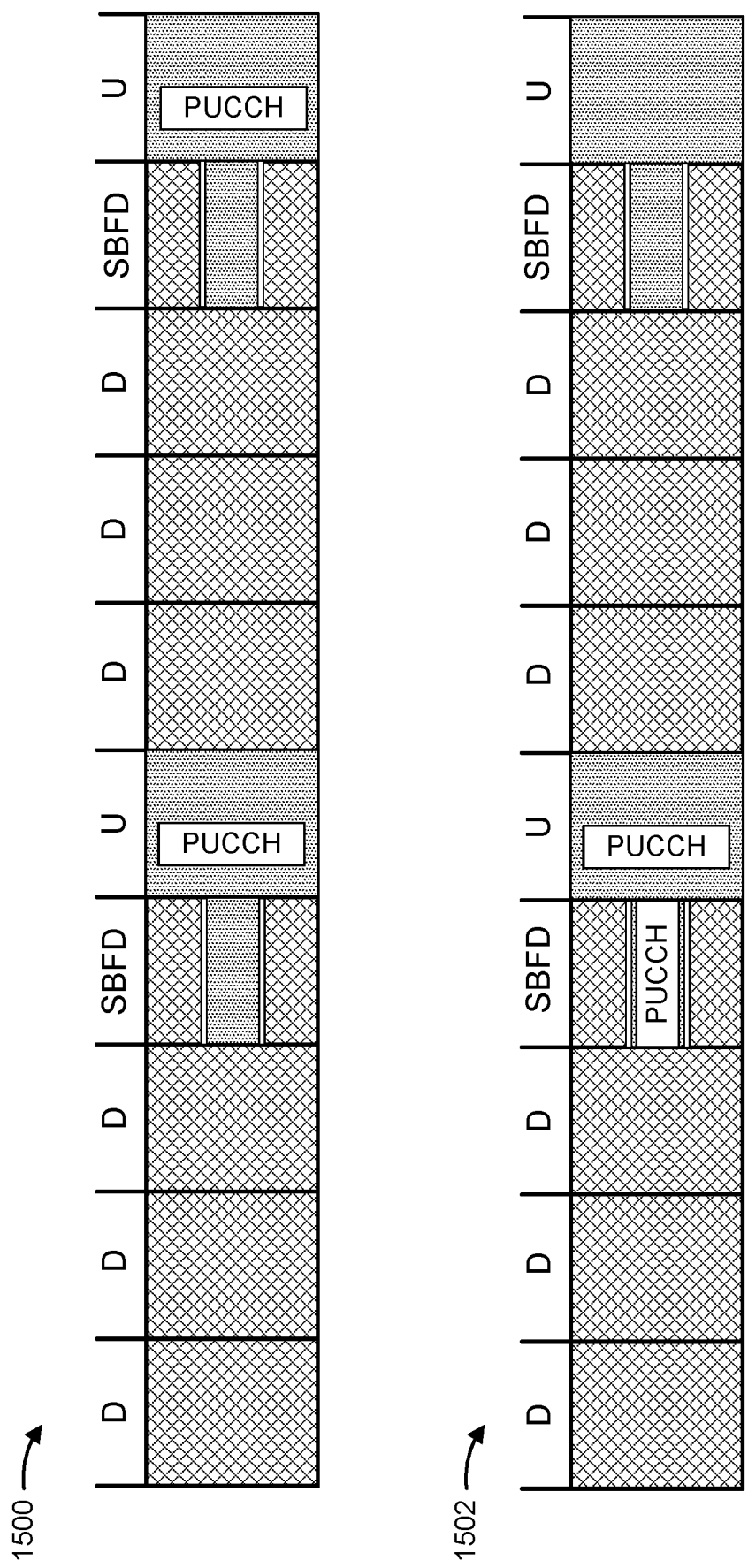
FIG. 15 is a diagram illustrating examples of a PUCCH repetition across slot types, in accordance with the present disclosure.

FIG. 15 is a diagram illustrating examples 1500, 1502 of a PUCCH repetition across slot types, in accordance with the present disclosure.

FIG. 15 shows an example 1500 where a first ("taller") PUCCH resource fits in a first uplink slot but not in uplink REs of a previous SBFD slot, which has a middle BWP for uplink. The first PUCCH resource and a second PUCCH resource may have to fit in a first uplink slot and a later, second uplink slot. Because there are four slots in between the first uplink slot and the second uplink slot, there will be some latency before the UE completes the PUCCH repetition.

In some aspects, if there was an SBFD slot, the base station may provide a third PUCCH resource indicator for the SBFD slot. FIG. 15 shows an example 1502 where a base station uses separate PUCCH resource indicators for the first PUCCH resource for the first instance and the second PUCCH resource for the first instance. As shown in example 1502, the base station may use a third PUCCH resource indicator for the SBFD slot to fit a middle BWP for uplink. The base station may provide a first PUCCH resource indicator for a "taller" PUCCH resource, which will fit in an adjacent uplink slot. As a result, there is no extra latency between PUCCH repetition instances, and the UE may complete the PUCCH repetition sooner.

As indicated above, FIG. 15 is provided as an example. Other examples may differ from what is described with respect to FIG. 15. For example, other sizes or shapes of RE configurations may fit within other appropriately sized SBFD slots.

Figure 16:
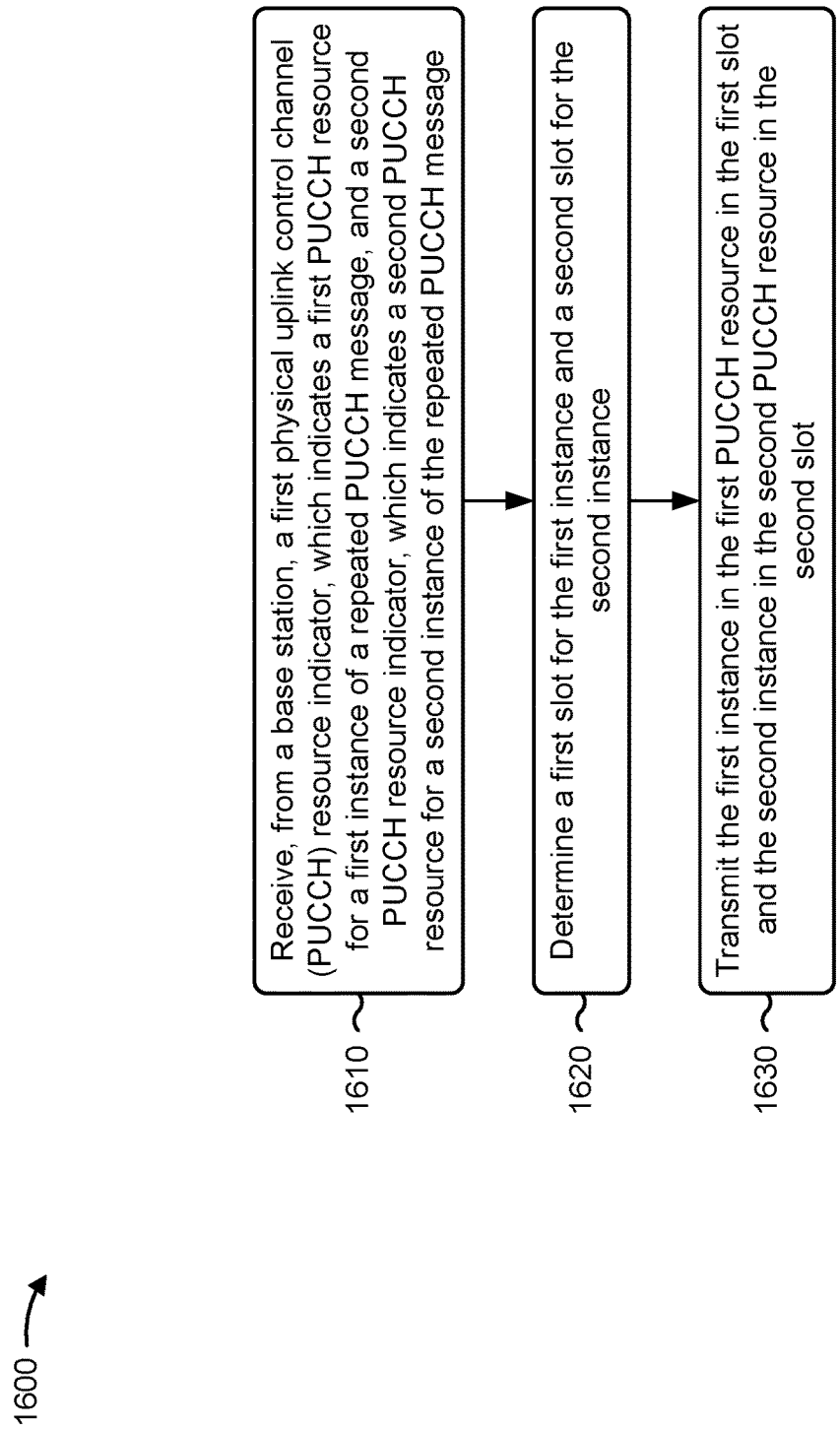
FIG. 16 is a diagram illustrating an example process performed, for example, by a UE, in accordance with the present disclosure.

FIG. 16 is a diagram illustrating an example process 1600 performed, for example, by a UE, in accordance with the present disclosure. Example process 1600 is an example where the UE (e.g., UE 120) performs operations associated with PUCCH repetition across slot types.

As shown in FIG. 16, in some aspects, process 1600 may include receiving, from a base station, a first PUCCH resource indicator, which indicates a first PUCCH resource for a first instance of a repeated PUCCH message, and a second PUCCH resource indicator, which indicates a second PUCCH resource for a second instance of the repeated PUCCH message (block 1610). For example, the UE (e.g., using receive processor 258, transmit processor 264, controller/processor 280, memory 282) may receive, from a base station, a first PUCCH resource indicator, which indicates a first PUCCH resource for a first instance of a repeated PUCCH message, and a second PUCCH resource indicator, which indicates a second PUCCH resource for a second instance of the repeated PUCCH message, as described above.

As further shown in FIG. 16, in some aspects, process 1600 may include determining a first slot for the first instance and a second slot for the second instance (block 1620). For example, the UE (e.g., using receive processor 258, transmit processor 264, controller/processor 280, memory 282) may determine a first slot for the first instance and a second slot for the second instance, as described above.

As further shown in FIG. 16, in some aspects, process 1600 may include transmitting the first instance in the first PUCCH resource in the first slot and the second instance in the second PUCCH resource in the second slot (block 1630). For example, the UE (e.g., using receive processor 258, transmit processor 264, controller/processor 280, memory 282) may transmit the first instance in the first PUCCH resource in the first slot and the second instance in the second PUCCH resource in the second slot, as described above.

Process 1600 may include additional aspects, such as any single aspect or any combination of aspects described below and/or in connection with one or more other processes described elsewhere herein.

In a first aspect, determining the first slot for the first instance and the second slot for the second instance includes determining the first slot for the first instance based at least in part on an RE configuration of the first PUCCH resource and a first slot type of the first slot, and determining the second slot for the second instance based at least in part on an RE configuration of the second PUCCH resource and a second slot type of the second slot.

In a second aspect, alone or in combination with the first aspect, at least one of the first slot type or the second slot type is one of a special slot type or a subband full duplex slot type.

In a third aspect, alone or in combination with one or more of the first and second aspects, a first RE configuration of the second PUCCH resource is different than a second RE configuration of the first PUCCH resource.

In a fourth aspect, alone or in combination with one or more of the first through third aspects, the first RE configuration includes a same quantity of REs as the second RE configuration.

In a fifth aspect, alone or in combination with one or more of the first through fourth aspects, the first RE configuration includes a different quantity of REs than the second RE configuration.

In a sixth aspect, alone or in combination with one or more of the first through fifth aspects, the second slot is adjacent to the first slot.

In a seventh aspect, alone or in combination with one or more of the first through sixth aspects, the repeated PUCCH message includes a repetition of uplink control information.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
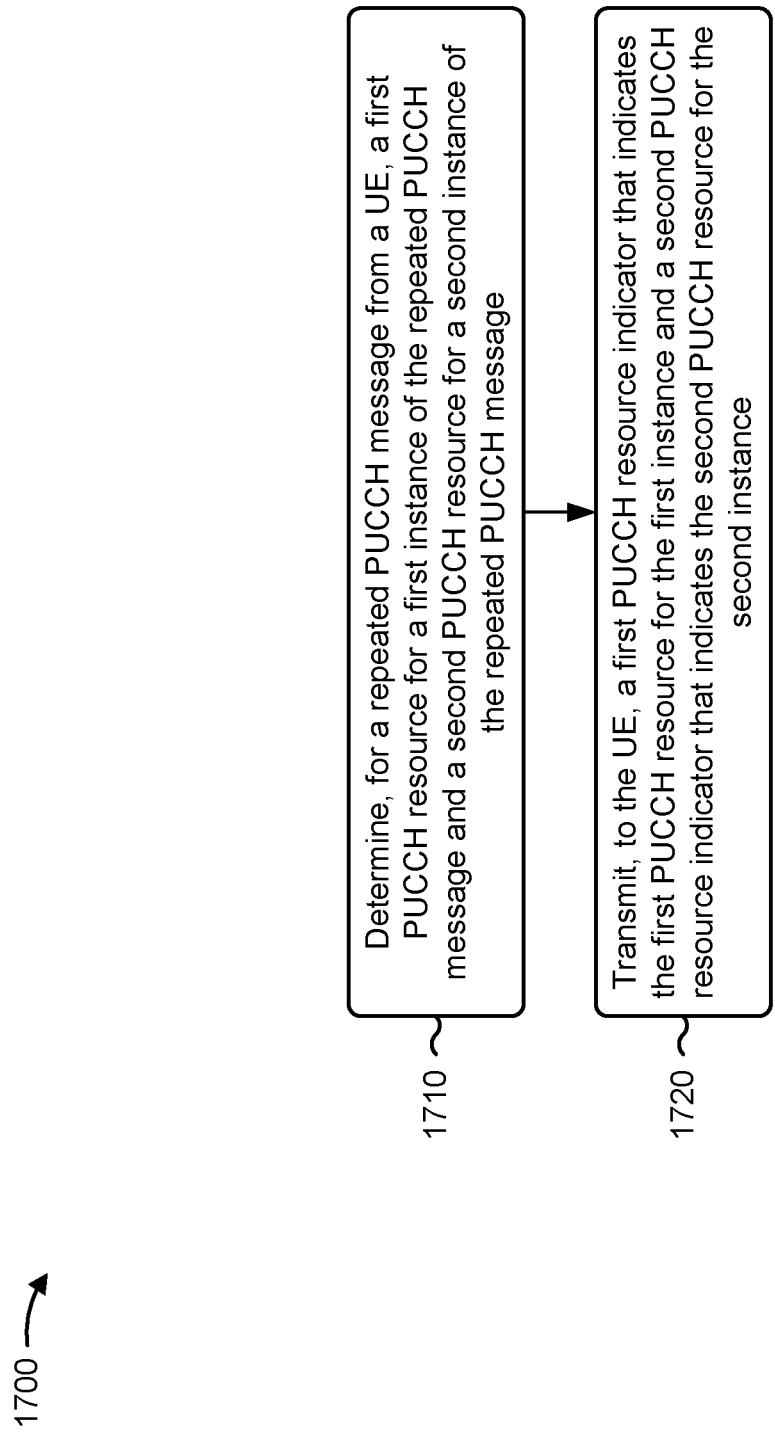
FIG. 17 is a diagram illustrating an example process performed, for example, by a base station, in accordance with the present disclosure.

FIG. 17 is a diagram illustrating an example process 1700 performed, for example, by a base station, in accordance with the present disclosure. Example process 1700 is an example where the base station (e.g., base station 110) performs operations associated with PUCCH repetition across slot types.

As shown in FIG. 17, in some aspects, process 1700 may include determining, for a repeated PUCCH message from a UE, a first PUCCH resource for a first instance of the repeated PUCCH message and a second PUCCH resource for a second instance of the repeated PUCCH message (block 1710). For example, the base station (e.g., using transmit processor 220, receive processor 238, controller/processor 240, memory 242) may determine, for a repeated PUCCH message from a UE, a first PUCCH resource for a first instance of the repeated PUCCH message and a second PUCCH resource for a second instance of the repeated PUCCH message, as described above.

As further shown in FIG. 17, in some aspects, process 1700 may include transmitting, to the UE, a first PUCCH resource indicator that indicates the first PUCCH resource for the first instance and a second PUCCH resource indicator that indicates the second PUCCH resource for the second instance (block 1720). For example, the base station (e.g., using transmit processor 220, receive processor 238, controller/processor 240, memory 242) may transmit, to the UE, a first PUCCH resource indicator that indicates the first PUCCH resource for the first instance and a second PUCCH resource indicator that indicates the second PUCCH resource for the second instance, as described above.

Process 1700 may include additional aspects, such as any single aspect or any combination of aspects described below and/or in connection with one or more other processes described elsewhere herein.

In a first aspect, determining the first PUCCH resource for the first instance and the second PUCCH resource for the second instance includes determining the first PUCCH resource for the first instance based at least in part on an RE configuration of the first PUCCH resource and a first slot type of a first slot for the first instance, and determining the second PUCCH resource for the second instance based at least in part on an RE configuration of the second PUCCH resource and a second slot type of a second slot for the second instance.

In a second aspect, alone or in combination with the first aspect, at least one of the first slot type or the second slot type is one of a special slot type or a subband full duplex slot type.

In a third aspect, alone or in combination with one or more of the first and second aspects, the second slot is adjacent to the first slot.

In a fourth aspect, alone or in combination with one or more of the first through third aspects, a first RE configuration of the second PUCCH resource is different than a second RE configuration of the first PUCCH resource.

In a fifth aspect, alone or in combination with one or more of the first through fourth aspects, the first RE configuration includes a same quantity of REs as the second RE configuration.

In a sixth aspect, alone or in combination with one or more of the first through fifth aspects, the first RE configuration includes a different quantity of REs than the second RE configuration.

In a seventh aspect, alone or in combination with one or more of the first through sixth aspects, the repeated PUCCH message includes a repetition of uplink control information.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving, from a base station, a first physical uplink control channel (PUCCH) resource indicator, which indicates a first PUCCH resource for a first instance of a repeated PUCCH message, and a second PUCCH resource indicator, which indicates a second PUCCH resource for a second instance of the repeated PUCCH message; determining a first slot for the first instance and a second slot for the second instance; and transmitting the first instance in the first PUCCH resource in the first slot and the second instance in the second PUCCH resource in the second slot.

Aspect 2: The method of Aspect 1, wherein determining the first slot for the first instance and the second slot for the second instance includes: determining the first slot for the first instance based at least in part on a resource element (RE) configuration of the first PUCCH resource and a first slot type of the first slot; and determining the second slot for the second instance based at least in part on an RE configuration of the second PUCCH resource and a second slot type of the second slot.

Aspect 3: The method of Aspect 2, wherein at least one of the first slot type or the second slot type is one of a special slot type or a subband full duplex slot type.

Aspect 4: The method of any of Aspects 1-3, wherein a first resource element (RE) configuration of the second PUCCH resource is different than a second RE configuration of the first PUCCH resource.

Aspect 5: The method of Aspect 4, wherein the first RE configuration includes a same quantity of REs as the second RE configuration.

Aspect 6: The method of Aspect 4, wherein the first RE configuration includes a different quantity of REs than the second RE configuration.

Aspect 7: The method of any of Aspects 1-6, wherein the second slot is adjacent to the first slot.

Aspect 8: The method of any of Aspects 1-7, wherein the repeated PUCCH message includes a repetition of uplink control information.

Aspect 9: A method of wireless communication performed by a base station, comprising: determining, for a repeated physical uplink control channel (PUCCH) message from a user equipment (UE), a first PUCCH resource for a first instance of the repeated PUCCH message and a second PUCCH resource for a second instance of the repeated PUCCH message; and transmitting, to the UE, a first PUCCH resource indicator that indicates the first PUCCH resource for the first instance and a second PUCCH resource indicator that indicates the second PUCCH resource for the second instance.

Aspect 10: The method of Aspect 9, wherein determining the first PUCCH resource for the first instance and the second PUCCH resource for the second instance includes determining the first PUCCH resource for the first instance based at least in part on a resource element (RE) configuration of the first PUCCH resource and a first slot type of a first slot for the first instance, and determining the second PUCCH resource for the second instance based at least in part on an RE configuration of the second PUCCH resource and a second slot type of a second slot for the second instance.

Aspect 11: The method of Aspect 10, wherein at least one of the first slot type or the second slot type is one of a special slot type or a subband full duplex slot type.

Aspect 12: The method of Aspect 10, wherein the second slot is adjacent to the first slot.

Aspect 13: The method of any of Aspects 9-12, wherein a first resource element (RE) configuration of the second PUCCH resource is different than a second RE configuration of the first PUCCH resource.

Aspect 14: The method of Aspect 13, wherein the first RE configuration includes a same quantity of REs as the second RE configuration.

Aspect 15: The method of Aspect 14, wherein the first RE configuration includes a different quantity of REs than the second RE configuration.

Aspect 16: The method of any of Aspects 9-15, wherein the repeated PUCCH message includes a repetition of uplink control information.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive, from a network entity, a first physical uplink control channel (PUCCH) resource indicator, which indicates a first PUCCH resource for a first instance of a repeated PUCCH message, and a second PUCCH resource indicator, which indicates a second PUCCH resource for a second instance of the repeated PUCCH message, wherein:
a first quantity of time resources in a first resource element (RE) configuration of the first PUCCH resource is different than a second quantity of time resources in a second RE configuration of the second PUCCH resource, or
a first quantity of frequency resources in the first RE configuration of the first PUCCH resource is different than a second quantity of frequency resources in the second RE configuration of the second PUCCH resource; and transmit the first instance in the first PUCCH resource in a first slot and the second instance in the second PUCCH resource in a second slot, wherein the first slot has a subband full duplex slot type.

2. The UE of claim 1, wherein the one or more processors are configured to:

determine the first slot for the first instance based at least in part on the first RE configuration of the first PUCCH resource and the subband full duplex slot type of the first slot; and determine the second slot for the second instance based at least in part on the second RE configuration of the second PUCCH resource and a slot type of the second slot.

3. The UE of claim 2, wherein the slot type of the second slot is an uplink slot type.

4. The UE of claim 1, wherein the first RE configuration includes a same quantity of REs as the second RE configuration.

5. The UE of claim 1, wherein the first RE configuration includes a different quantity of REs than the second RE configuration.

6. The UE of claim 1, wherein the second slot is adjacent to the first slot.

7. The UE of claim 1, wherein the repeated PUCCH message includes a repetition of uplink control information.

8. A network entity for wireless communication, comprising:

one or more memories; and one or more processors, coupled to the one or more memories, configured to:

determine, for a repeated physical uplink control channel (PUCCH) message from a user equipment (UE), a first PUCCH resource for a first instance of the repeated PUCCH message in a first slot and a second PUCCH resource for a second instance of the repeated PUCCH message in a second slot, wherein the first slot has a subband full duplex slot type, and wherein:

a first quantity of time resources in a first resource element (RE) configuration of the first PUCCH resource is different than a second quantity of time resources in a second RE configuration of the second PUCCH resource, or a first quantity of frequency resources in the first RE configuration of the first PUCCH resource is different than a second quantity of frequency resources in the second RE configuration of the second PUCCH resource; and transmit, to the UE, a first PUCCH resource indicator that indicates the first PUCCH resource for the first instance and a second PUCCH resource indicator that indicates the second PUCCH resource for the second instance.

9. The network entity of claim 8, wherein the one or more processors are configured to:

determine the first PUCCH resource for the first instance based at least in part on the first RE configuration of the first PUCCH resource and the subband full duplex slot type of the first slot for the first instance, and determine the second PUCCH resource for the second instance based at least in part on the second RE configuration of the second PUCCH resource and a slot type of the second slot for the second instance.

10. The network entity of claim 9, wherein the slot type of the second slot is an uplink slot type.

11. The network entity of claim 9, wherein the second slot is adjacent to the first slot.

12. The network entity of claim 8, wherein the first RE configuration includes a same quantity of REs as the second RE configuration.

13. The network entity of claim 8, wherein the first RE configuration includes a different quantity of REs than the second RE configuration.

14. The network entity of claim 8, wherein the repeated PUCCH message includes a repetition of uplink control information.

15. A method of wireless communication performed by a user equipment (UE), comprising:

receiving, from a network entity, a first physical uplink control channel (PUCCH) resource indicator, which indicates a first PUCCH resource for a first instance of a repeated PUCCH message, and a second PUCCH resource indicator, which indicates a second PUCCH resource for a second instance of the repeated PUCCH message, wherein:

a first quantity of time resources in a first resource element (RE) configuration of the first PUCCH resource is different than a second quantity of time resources in a second RE configuration of the second PUCCH resource, or a first quantity of frequency resources in the first RE configuration of the first PUCCH resource is different than a second quantity of frequency resources in the second RE configuration of the second PUCCH resource; and transmitting the first instance in the first PUCCH resource in a first slot and the second instance in the second PUCCH resource in a second slot, wherein the first slot has a subband full duplex slot type.

16. The method of claim 15, further comprising:

determining the first slot for the first instance based at least in part on the first RE configuration of the first PUCCH resource and the subband full duplex slot type of the first slot; and determining the second slot for the second instance based at least in part on the second RE configuration of the second PUCCH resource and a slot type of the second slot.

17. The method of claim 16, wherein the slot type of the second slot is an uplink slot type.

18. The method of claim 15, wherein the first RE configuration includes a same quantity of REs as the second RE configuration.

19. The method of claim 15, wherein the first RE configuration includes a different quantity of REs than the second RE configuration.

20. The method of claim 15, wherein the second slot is adjacent to the first slot.

21. The method of claim 15, wherein the repeated PUCCH message includes a repetition of uplink control information.

22. A method of wireless communication performed by a network entity, comprising:

determining, for a repeated physical uplink control channel (PUCCH) message from a user equipment (UE), a first PUCCH resource for a first instance of the repeated PUCCH message in a first slot and a second PUCCH resource for a second instance of the repeated PUCCH message in a second slot, wherein the first slot has a subband full duplex slot type, and wherein:

a first quantity of time resources in a first resource element (RE) configuration of the first PUCCH resource is different than a second quantity of time resources in a second RE configuration of the second PUCCH resource, or a first quantity of frequency resources in the first RE configuration of the first PUCCH resource is different than a second quantity of frequency resources in the second RE configuration of the second PUCCH resource; and transmitting, to the UE, a first PUCCH resource indicator that indicates the first PUCCH resource for the first instance and a second PUCCH resource indicator that indicates the second PUCCH resource for the second instance.

23. The method of claim 22, further comprising:

determining the first PUCCH resource for the first instance based at least in part on the first RE configuration of the first PUCCH resource and the subband full duplex slot type of the first slot for the first instance, and determining the second PUCCH resource for the second instance based at least in part on the second RE configuration of the second PUCCH resource and a slot type of the second slot for the second instance.

24. The method of claim 23, wherein the slot type of the second slot is an uplink slot type.

25. The method of claim 23, wherein the second slot is adjacent to the first slot.

26. The method of claim 22, wherein the repeated PUCCH message includes a repetition of uplink control information.

27. The UE of claim 1, wherein the first quantity of time resources in the first RE configuration of the first PUCCH resource is greater than the second quantity of time resources in the second RE configuration of the second PUCCH resource.

28. The UE of claim 1, wherein the first quantity of frequency resources in the first RE configuration of the first PUCCH resource is less than the second quantity of frequency resources in the second RE configuration of the second PUCCH resource.

29. The method of claim 22, wherein the first RE configuration includes a same quantity of REs as the second RE configuration.

30. The method of claim 22, wherein the first RE configuration includes a different quantity of REs than the second RE configuration.

* * * * *